(12) United States Patent
Saitoh et al.

(10) Patent No.: US 10,906,731 B2
(45) Date of Patent: Feb. 2, 2021

(54) DRIP BAG

(71) Applicant: OHKI CO., LTD., Osaka (JP)

(72) Inventors: Mitsunori Saitoh, Takatsuki (JP); Akiko Miyawaki, Osaka (JP)

(73) Assignee: OHKI CO., LTD., Osaka (JP)

( * ) Notice: Subject to any disclaimer, the term of this patent is extended or adjusted under 35 U.S.C. 154(b) by 13 days.

(21) Appl. No.: 16/275,732

(22) Filed: Feb. 14, 2019

(65) Prior Publication Data
US 2019/0177080 A1 Jun. 13, 2019

Related U.S. Application Data

(63) Continuation of application No. 14/423,542, filed as application No. PCT/JP2013/083223 on Dec. 11, 2013, now Pat. No. 10,246,252.

(30) Foreign Application Priority Data

Dec. 11, 2012 (WO) .................. PCT/JP2012/082112

(51) Int. Cl.
*B65D 85/812* (2006.01)
*A47J 31/06* (2006.01)
*A47J 31/02* (2006.01)

(52) U.S. Cl.
CPC ............ *B65D 85/812* (2013.01); *A47J 31/02* (2013.01); *A47J 31/06* (2013.01); *A47J 31/0626* (2013.01); *A47J 31/0636* (2013.01)

(58) Field of Classification Search
CPC . B65D 85/812; A47J 31/0626; A47J 31/0636; A47J 31/06; A47J 31/02
See application file for complete search history.

(56) References Cited

U.S. PATENT DOCUMENTS 4,519,911 A * 5/1985 Shimizu .................. A47J 31/02
 210/478
4,560,475 A * 12/1985 Kataoka ............. B65D 85/8043
 210/249

(Continued)

FOREIGN PATENT DOCUMENTS

CA 2617124 A1 2/2007
CN 1547443 A 11/2004

(Continued)

OTHER PUBLICATIONS

Jan. 14, 2014 International Search Report issued in International Patent Application No. PCT/JP2013/083223.

(Continued)

*Primary Examiner* — Viren A Thakur
(74) *Attorney, Agent, or Firm* — Oliff PLC

(57) ABSTRACT

A drip bag including a bag body having an upper end to be opened and two opposing surfaces, and a pair of hook members provided on outer faces of the opposing surfaces and spaced apart from vertical side edges of the bag body. Each of the hook members including an upper stuck part adhered along an opening of the bag body, a center part located below the upper stuck part, and a hook part not adhered to the bag body. For each of the hook members, a pair of oblique folding lines are formed on the upper stuck part, and a vertical folding line is formed downwardly from a lower end of each oblique folding line, whereby, in use, at least the oblique folding lines and the vertical folding lines cause the outer faces of the bag body to protrude outward from a bottom end of the bag body.

15 Claims, 13 Drawing Sheets

(56) References Cited

U.S. PATENT DOCUMENTS

| | | | |
|---|---|---|---|
| 8,746,131 B2* | 6/2014 | Saitoh | A47J 31/005 210/474 |
| 2004/0168578 A1 | 9/2004 | Saitoh et al. | |
| 2006/0255112 A1 | 11/2006 | Sweet | |
| 2012/0000369 A1 | 1/2012 | Saitoh et al. | |

FOREIGN PATENT DOCUMENTS

| | | | | |
|---|---|---|---|---|
| CN | 2730270 | Y | | 10/2005 |
| CN | 102046050 | A | | 5/2011 |
| CN | 102670075 | A | | 9/2012 |
| EP | 2281492 | A1 | | 2/2011 |
| JP | H06-62940 | U | | 9/1994 |
| JP | 2000-211670 | A | | 8/2000 |
| JP | 2004024763 | A | | 1/2004 |
| JP | 2004195198 | A | * | 7/2004 |
| JP | 2004242760 | A | * | 9/2004 |
| JP | 2004242847 | A | | 9/2004 |
| JP | 2004357929 | A | * | 12/2004 |
| JP | 3674486 | B2 | | 7/2005 |
| JP | 2006036357 | A | | 2/2006 |
| JP | 2006-076600 | A | | 3/2006 |
| JP | 2006076600 | A | * | 3/2006 |
| JP | 2007167607 | A | * | 7/2007 |
| JP | 2007167607 | A | | 7/2007 |
| JP | 2007296285 | A | * | 11/2007 |
| JP | 4079041 | B2 | | 4/2008 |
| JP | 2010110335 | A | * | 5/2010 ............ A47J 31/02 |
| JP | 4652000 | B2 | | 3/2011 |
| JP | 2012125406 | A | | 7/2012 |
| JP | 2012143418 | A | | 8/2012 |
| JP | 2012188134 | A | | 10/2012 |
| JP | 2012188134 | A | * | 10/2012 |
| KR | 10-2011-0022565 | A | | 3/2011 |
| WO | 03/011089 | A1 | | 2/2003 |
| WO | 2009/144852 | A1 | | 12/2009 |
| WO | WO-2009144852 | A1 | * | 12/2009 ............ A47J 31/005 |

OTHER PUBLICATIONS

Translation of International Search Report issued in International Patent Application No. PCT/JP2013/083223.
Nov. 9, 2015 Office Action issued in Korean Patent Application No. 2014-7035087.
Feb. 14, 2016 Office Action issued in Chinese Patent Application No. 201380028767.9.
Apr. 26, 2016 Office Action issued in Taiwanese Patent Application No. 102145790.
Jul. 7, 2016 extended search report issued in European Patent Application No. 13862978.7.
Jul. 12, 2016 Second Office Action issued in Chinese Patent Application No. 201380028767.9.
Dec. 19, 2016 Office Action issued in Chinese Patent Application No. 201380028767.9.
Sep. 12, 2017 Office Action with Search Report issued in Russian Patent Application No. 2015111670.

* cited by examiner (ENLARGED VIEW OF A)

(ENLARGED VIEW OF A)

DRIP BAG

This is a Continuation of U.S. application Ser. No. 14/423, 542 filed on Feb. 24, 2015, which in turn is a PCT National Phase Application of PCT/JP2013/083223 filed on Dec. 11, 2013, which claims the benefit of Application No. PCT/JP2012/082112 filed on Dec. 11, 2012. The disclosure of the prior applications is hereby incorporated by reference herein in its entirety.

TECHNICAL FIELD

The present invention relates to a drip bag which is hooked on the upper portion of a container such as cups, thereby allowing an extract such as coffee, tea, green tea, or Chinese herbal medicine to be readily provided by a drip method.

BACKGROUND ART

Conventionally, the paper drip method has been widely accepted as a coffee serving method that enables one to enjoy genuine coffee in an easy-to-prepare manner. This paper drip method typically allows several cups of coffee to be extracted at a time.

On the other hand, more and more people live alone these days and the number of people in one family has been reduced, for example, due to an increase in the number of nuclear families and a drop in birth rate. Thus, in place of the conventional paper drip method that is basically configured to extract several cups of coffee, such disposable drip bags that are intended to extract one cup of coffee in an easy-to-prepare manner have been available in various product types in the market.

Among other things, now available is a drip bag in a simple structure that can be manufactured at low costs. The drip bag has a bag body made of a water permeable filtering sheet and paper plate hook members that are adhered to the outer faces of the two opposing surfaces of the bag body, with the hook members formed in a special shape (Patent Literature 1).

As shown in FIG. 22, according to the drip bag 1X, hook parts 11X of hook members 10X are pulled out from a bag body 2 so as to hook the hook parts 11X on a cup 200. This allows the drip bag 1X to be easily set to the cup 200 with the opening 3 of the bag body 2 kept open.

CITATION LIST

Patent Literature

[Patent Literature 1] Japanese Patent No. 4079041

SUMMARY OF INVENTION

Technical Problem

When being used with a cup of a typical opening diameter, the drip bag 1X mentioned above allows the opening 3 of the bag body 2 to be widely opened in a rectangular shape as shown in FIG. 22, so that hot water can be easily poured into the bag body 2. However, to further facilitate pouring hot water through the opening 3, the opening area of the opening 3 is desirably further increased. It is also preferable to maintain the large opening area irrespective of the magnitude of the opening diameter of the cup. To increase and thereby maximize the opening area of the opening using the same bag body, it is conceivable to open the opening 3 in the shape of a perfect circle. However, the difference in rigidity between the water permeable filtering sheet forming the bag body 2 and the thin plate-shaped material forming the hook members 10X should be satisfied. Easiness should also be satisfied which is required of the opening manipulation to open the opening 3 of the bag body 2 only by pulling, in the mutually opposite directions, the pair of hook members adhered to the two opposing surfaces of the bag body 2. From these points of view, it is difficult to open the opening 3 in the shape of a perfect circle.

In contrast to this, an object of the present invention is to provide a drip bag which has a simple structure with the hook members adhered to the outer faces of the two opposing surfaces of the bag body and which when the drip bag is set to a cup, the opening area of the opening of the bag body is increased and the opening shape of the widely opened bag body is stabilized irrespective of the magnitude of the opening diameter of the cup.

Solution to Problem

The inventor has found the following feature and thus completed the present invention. The feature is implemented by providing a special shape and special folding lines to the hook members that are adhered to the outer faces of two opposing surfaces of the bag body, whereby the opening of the bag body is opened in a generally octagonal shape and the opening shape can be more easily maintained irrespective of the magnitude of the opening diameter of the cup.

That is, the present invention provides a drip bag which has a bag body formed of a water permeable filtering sheet and having an upper end to be opened, and hook members formed of a thin plate-shaped material and provided on outer faces of two opposing surfaces of the bag body. The hook member includes: an upper stuck part which is adhered to the bag body along the opening of the bag body; a center part which is located below the upper stuck part at the center of the bag body in the width direction thereof and formed so as not to be pulled out from the bag body; and a hook part not adhered to the bag body. The drip bag is configured such that a pair of oblique folding lines are formed on the upper stuck part with a center line disposed therebetween, the oblique folding lines being more spaced from the center line while extending from the lower portion to the upper portion of the upper stuck part, the center line bisecting the bag body in the width direction thereof; and a vertical folding line is formed downwardly from immediately below a lower end of the oblique folding lines.

Advantageous Effects of Invention

According to the drip bag of the present invention, when the pair of opposing hook parts on the outer faces of the bag body are pulled out in the opposite directions and then hooked on a cup, the region sandwiched between the pair of oblique folding lines is inclined on the upper stuck part along the opening of the bag body and thereby the upper end side of the upper stuck part is bent into three sides, whereby the opening of the bag body is opened in a generally octagonal shape. It is thus possible to increase the opening area of the opening when compared with a conventional drip bag in which the opening of the bag body is opened in a rectangular shape.

Furthermore, even when the hook parts on the opposing surfaces of the bag body are pulled out by a small force in the mutually opposite directions when the drip bag is set to a cup having a reduced opening diameter, the upper end side of the upper stuck part along the opening of the bag body is bent into three sides, and thus the opening shape can be prevented from being narrowed in a flat shape. On the other hand, even when the hook parts on the opposing surfaces of the bag body are pulled out in the mutually opposite directions by a large force when the drip bag is set to a cup having an increased opening diameter, the region sandwiched between the pair of oblique folding lines maintains the three bent sides of the upper end side of the upper stuck part, so that the opening is opened in a generally octagonal shape, and a wide opening area can be ensured.

DESCRIPTION OF EMBODIMENTS

Now, a description will be made to a drip bag of the present invention in more detail with reference to the drawings. Note that in each of the drawings, like reference symbols indicate like or equivalent components.

Figure 1A:
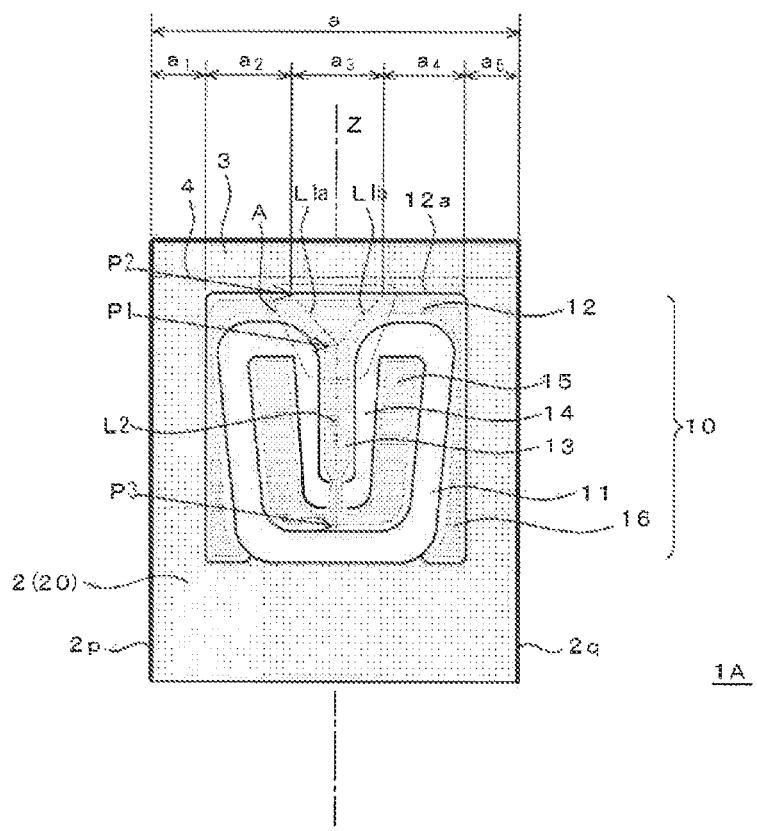
FIG. 1A is a plan view illustrating a drip bag 1A of an embodiment before being opened.

FIG. 1A is a plan view illustrating a drip bag 1A before being opened according to an embodiment of the present invention. The drip bag 1A has a bag body 2 with two opposing surfaces, and hook members 10 which are provided on outer faces of the two opposing surfaces of the bag body 2.

The bag body 2 is formed of a water permeable filtering sheet in the shape of an elongated flat bag which is rectangular when viewed from above, and is provided with an opening guide line 4 such as perforations for forming an opening 3 on the upper end. The bag body 2 is filled with a material to be extracted such as coffee, tea, green tea, or Chinese herbal medicine.

Figure 2:
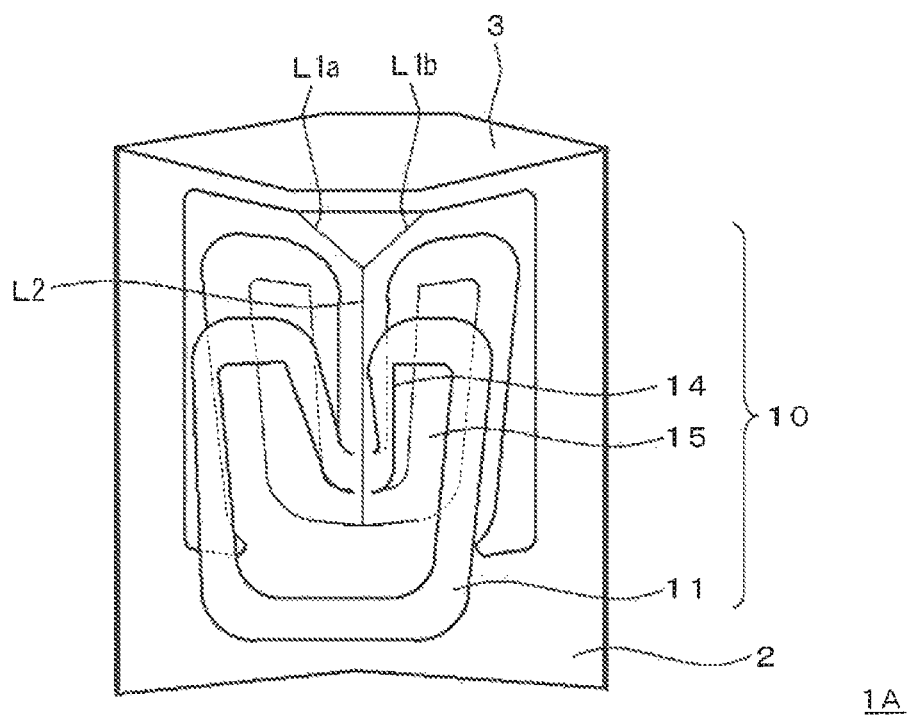
FIG. 2 is a perspective view illustrating the drip bag 1A of the embodiment after being opened.

FIG. 2 is a perspective view illustrating the state in which the upper end of the drip bag 1A is removed and opened along the opening guide line 4, and then hook parts 11 of the hook members 10 are being pulled out from the bag body 2.

Here, the hook members 10 of the drip bag 1A are formed by punching a thin plate-shaped material such as a paper plate or a plastic sheet and then adhered to the bag body 2. As shown in, for example, FIG. 1A, a first region is formed that includes dots closely spaced apart, and a second region is formed around the first region, where the second region includes dots that are further spaced apart than the spacing of the dots of the first region. The first region corresponding to part of areas of the hook members 10 where the part of the areas of the hook members 10 are adhered to the outer face of the bag body 2 by heat sealing or adhesion and thus cannot be pulled off from the face of the bag body 2. The second region corresponding to exposed portions of the bag body 2.

The drip bag of the present invention is provided with two opposing surfaces on the bag body, and provided on each of the surfaces is the hook member 10 including: an upper stuck part 12 to be adhered to the bag body 2 along the opening 3 of the bag body 2; a center part which is located below the upper stuck part 12 at the center in the width direction of the bag body 2 and formed so as not to be pulled out from the bag body 2; and the hook part 11 which is not adhered to the bag body 2. In particular, the drip bag 1A of this embodiment is configured such that the hook member 10 has, as the upper stuck part 12, an elongated stuck part that is adhered in an elongated shape to the bag body 2 along the opening 3; and as the center part, a first center stuck part 13 that is adhered to the bag body 2. The hook member 11 is continuous to the first center stuck part 13 via arm parts 14. More specifically, the first center stuck part 13 is formed by extending downwardly (i.e., towards the bottom of the bag body 2) from the center of the upper stuck part 12, and a pair of arm parts 14 are formed to be capable of being pulled out from the bag body 2 on both sides of the first center stuck part 13. Here, the lower ends of the arm parts 14 are continuous to the lower portion of the first center stuck part 13, and the upper ends of the arm parts 14 are continuous to the upper portion of the hook parts 11. The hook member 10 also has a pair of second center stuck parts 15. The second center stuck parts 15 are adhered adjacent to the pair of arm parts 14 toward the bag body sides $2p$ and $2q$ and continuous to the lower portion of the first center stuck part 13. Thus, according to the drip bag 1A, the region below the first center stuck part 13 and the pair of second center stuck parts 15 form a U-shaped stuck region at the center of the bag body 2.

On the other hand, from both the right and left ends of the upper stuck part 12, reinforcement parts 16 extend and are adhered to the bag body 2 along the outer sides of the hook parts 11 extending in the vertical direction.

The drip bag 1A has a distinguished feature in the folding lines that a pair of oblique folding lines L1a and L1b are formed at least on the upper stuck part 12 with a center line Z disposed therebetween in the width direction of the bag body 2. The oblique folding lines L1a and Lib are more spaced apart from the center line Z in the width direction of the bag body 2 while extending from the lower portion to the upper portion of the upper stuck part 12. Preferably, the drip bag 1A has the pair of oblique folding lines L1a and L1b which are more spaced apart from the center line Z in the width direction of the bag body 2 while extending from the upper center portion of the first center stuck part 13 to the upper end side 12a of the upper stuck part 12. The pair of oblique folding lines L1a and L1b overlap each other at the lower ends thereof to thereby form a V-shaped folding line, and one vertical folding line L2 extends from the lower end thereof to the lower end of the first center stuck part 13. Note that in the present invention, the vertical folding line L2 may only have to be located immediately below the lower end of the pair of oblique folding lines L1a and L1b formed in a V-shape, and the vertical folding line L2 may not have to be continuous to the oblique folding lines L1a and Lib. Furthermore, the vertical folding line L2 only have to extend downwardly, preferably to the lower portion of the first center stuck part 13.

Furthermore, the pair of oblique folding lines L1a and L1b generally trisect the upper end side 12a of the upper stuck part 12. The upper stuck part 12 has no other folding lines formed thereon except the pair of oblique folding lines L1a and L1b formed in a V-shape.

Furthermore, according to the drip bag 1A, these folding lines are formed to be readily folded so that the pair of oblique folding lines L1a and L1b and the vertical folding line L2 are folded only by pulling the pair of hook parts 11 in the opposite directions. For example, to form folding lines of perforations, it is preferable to make a tie (uncut portion) as short as possible relative to the length of a cut of the perforations and the number of ties as small as possible.

Figure 1B:
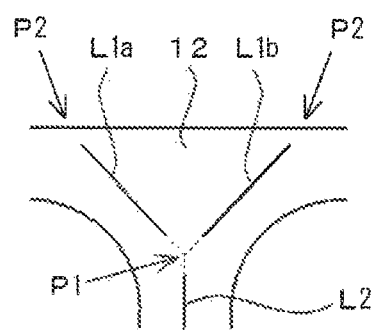
FIG. 1B is a partially enlarged view illustrating the drip bag 1A.

As will be discussed later, the triangular region surrounded by the pair of oblique folding lines L1a and L1b and the upper end side 12a of the upper stuck part 12 may be readily tilted so that the upper end side of the triangular region is brought closer to the center of the opening 3 of the bag body 2 only by pulling the hook parts 11 of the pair of hook members 10 of the drip bag 1A in the mutually opposite directions. To this end, as shown in FIG. 1B, an intersection P1 between the pair of oblique folding lines L1a and L1b and the vertical folding line L2 and the vicinity thereof as well as the upper ends P2 of the oblique folding lines L1a and L1b can be formed as ties, and the other folding lines can be formed of only cuts.

Figure 1C:
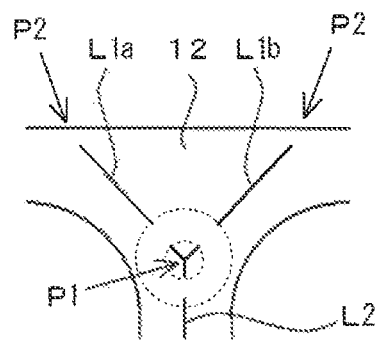
FIG. 1C is a partially enlarged view illustrating a modified example of the drip bag 1A.

Alternatively, as shown in FIG. 1C, the intersection P1 between the pair of oblique folding lines L1a and Lib and the vertical folding line L2 and the vicinity thereof may be formed of cuts, but ties may be provided immediately outside the cuts, and the upper ends P2 of the oblique folding lines L1a and Lib may also be formed as ties and the other folding lines may be formed as cuts.

Taking into account the workability of adhering the hook members 10 to the water permeable filtering sheet that forms the bag body 2, it is preferable that the pair of oblique folding lines L1a and L1b may be provided with two ties or less and the vertical folding line L2 with three ties or less.

Note that the oblique folding lines L1a and L1b and the vertical folding line L2 may be creased so that the lines are easily folded, and may also be formed by being cut halfway therethrough.

On the other hand, as the water permeable filtering sheet 20 for forming the bag body 2, various types of sheets may be used which allow a predetermined amount of extraction material to effuse when the extraction material is charged into the bag body and hot water is poured therein. In general, known as the effusion sheet are, for example, synthetic fiber such as polyester, nylon, polyethylene, polypropylene, or vinylon; semisynthetic fiber such as rayon; woven fabric or nonwoven fabric of single or composite fiber of natural fiber such as mulberry and mitsumata plant; mixed paper of Manila hemp, wood pulp, polypropylene fiber or the like; and papers such as tea bag base paper. These can also be used for the present invention.

To reduce loads to the environment, unbleached fiber may be used to form the water permeable filtering sheet 20, and unbleached thin plate-shaped material may be used to form the hook member 10. Furthermore, from the viewpoint of disposal of drip bags after use, it is preferable for the water permeable filtering sheet material and the thin plate-shaped material to contain biodegradable fiber. Biodegradable fibers may include polylactic acid, polybutylene succinate, and polyethylene succinate.

Furthermore, for an extract material such as coffee powder, moderate steaming effects can be preferably imparted to the extraction material when being dripped. In this context, in manufacturing the water permeable filtering sheet from a fiber material, it is possible to employ a dense and non-dense multi-layer structure in which the voidage of the fiber layers can be adjusted to make a layer directly in contact with the extraction material "non-dense," whereas the layer not directly in contact therewith is made "dense." In this structure, it is preferable to provide a higher content of hydrophobic fiber to the layer directly in contact with the extraction material and a lower content of hydrophobic fiber to the layer not directly in contact with the extraction material (Japanese Patent No. 3674486).

Figure 3A:
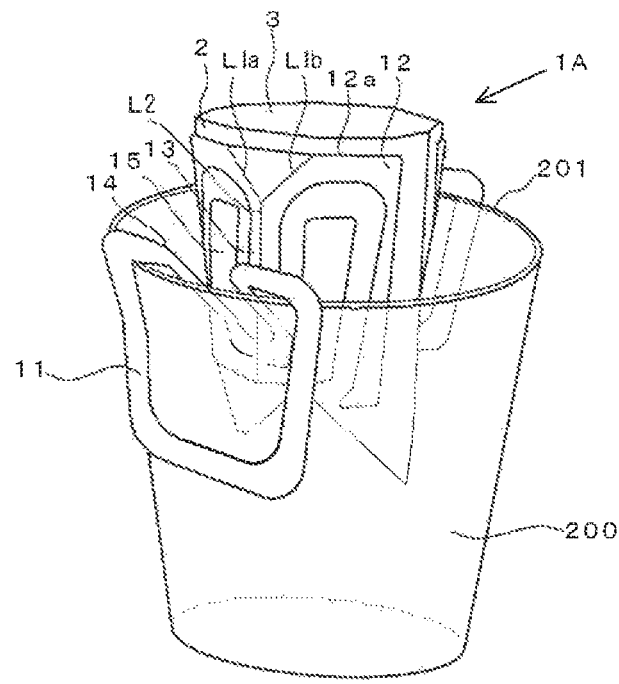
FIG. 3A is a perspective view illustrating the drip bag 1A of the embodiment which is set on a cup.

In a method for using the drip bag 1A, the upper end of the bag body 2 is first cut away along the opening guide line 4 such as perforations to thereby open the bag body 2. Then, as shown in FIG. 2, the hook parts 11 of the pair of hook members 10 on the front and rear surfaces of the bag body 2 are pulled out in the mutually opposite directions to thereby raise the arm parts 14 and the hook parts 11. The hook parts 11 are further pulled out and then the hook parts 11 are hooked on a cup 200 as shown in FIG. 3A.

Figure 3B:
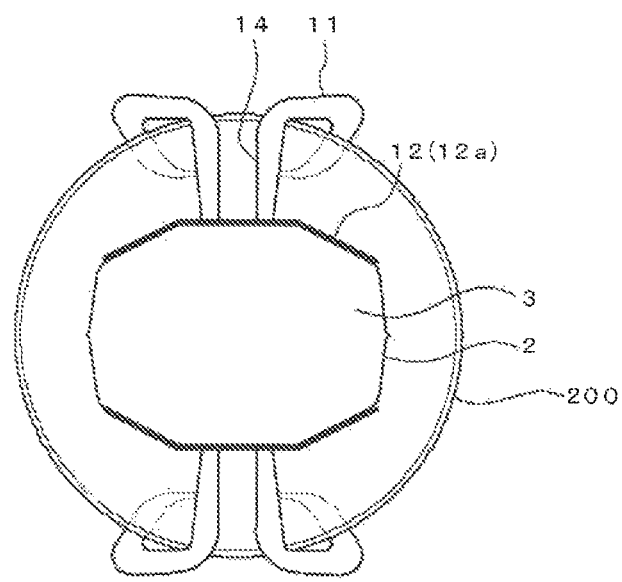
FIG. 3B is a top view illustrating the drip bag 1A of the embodiment which is set on a cup.

In this case, pulling out the hook parts 11 causes the first center stuck part 13 continuous to the hook parts 11 to be also pulled out, and pulling out the opposing surfaces of the bag body 2 in the opposite directions causes the vertical folding line L2 to be naturally folded and the lower end of the pair of oblique folding lines L1a and L1b formed in a V-shape to be also pulled out. Thus, the triangular region surrounded by the pair of oblique folding lines L1a and L1b and the upper end side 12a of the upper stuck part 12 is tilted so that the upper end side of the triangular region approaches the center of the opening 3 of the bag body 2. Thus, the upper end side 12a of the upper stuck part 12 is bent into three sides. In this manner, according to the drip bag 1A, the opening 3 of the bag body 2 is opened in a generally octagonal shape as shown in FIG. 3B only by pulling the hook parts 11 of the pair of the hook members 10 in the mutually opposite directions.

By opening the opening 3 of the bag body 2 in a generally octagonal shape, the opening area of the opening 3 is increased as compared to the opening area of a conventional drip bag of which opening was opened in a rectangular shape. It is thus facilitated to pour hot water into the bag body 2. In particular, as shown in FIG. 1A, assume that "a" is the width of the bag body 2; $a_1$ and $a_5$ are the respective distances from the right and left sides of the bag body 2 to the hook member 10; $a_2$ and $a_5$ are the respective distances from the right and left ends of the upper end side 12a of the upper stuck part 12 to the upper ends of the oblique folding lines L1a and L1b; and $a_3$ is the separation between the upper ends of the oblique folding lines L1a and L1b, then it holds:

$$a_2 = a_3 = a_4 = a_1 + a_5, \text{ and}$$

$$a_1 = a_5.$$

In this case, that is, when the upper ends of the oblique folding lines L1a and L1b on the upper end side 12a of the upper stuck part 12 are located at ⅜ the width "a" of the bag body 2 from the respective right and left sides toward the center of the bag body 2, and the distance between the upper stuck part 12 and the respective sides of the bag body 2 is ⅛ the width "a," the drip bag can be opened in a regular octagonal shape. The area S of the regular octagon is:

$$S_8 = (a^2 \times \tan 67.5)/8.$$

On the other hand, when a conventional drip bag having a bag body of the same width "a" is opened in a square, the area $S_4$ of the square is $S_4 = a^2/4$.

Therefore, the ratio $Se/S_4$ of the area Se of the regular octagon to the area $S_4$ of the square is:

$$S_8/S_4 = 1.206,$$

thus providing an increase by about 21%.

Figure 4A:
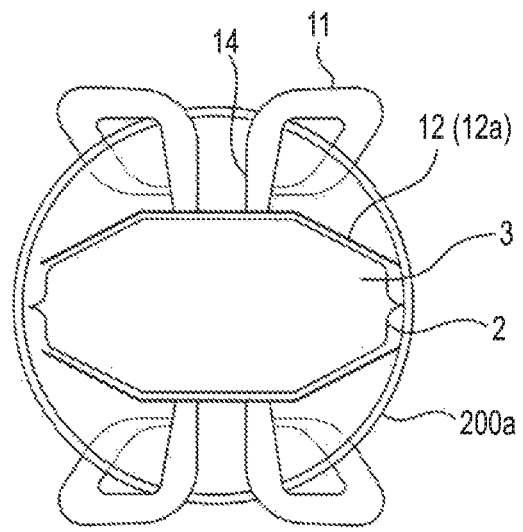
FIG. 4A is a top view illustrating the drip bag 1A of the embodiment which is set on a cup of a reduced opening diameter.

Furthermore, as shown in FIG. 4A, even when the drip bag 1A is set to a cup 200a having a reduced opening diameter, the upper end side 12a of the upper stuck part 12 along the opening 3 is bent into three sides, thereby causing the opening 3 of the bag body 2 to be opened more widely than the conventional drip bag of which opening is opened in a rectangular shape.

Figure 4B:
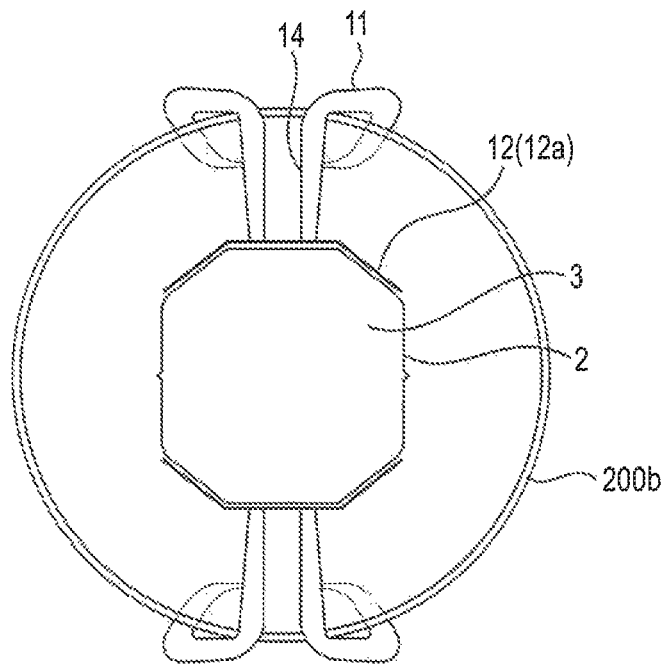
FIG. 4B is a top view illustrating the drip bag 1A of the embodiment which is set on a cup of an increased opening diameter.

Furthermore, as shown in FIG. 4B, even when the drip bag 1A is set to a cup 200b having an increased opening diameter and then the first center stuck part 13 is strongly pulled out by the arm parts 14, the upper stuck part 12 along the opening 3 is not bent into two but into three sides, thereby allowing the opening 3 of the bag body 2 to be opened in a generally octagonal shape. Thus, according to the drip bag 1A, the opening shape of the opening 3 can be increased with stability irrespective of the magnitude of the opening diameter of the cup, thus providing improved ease of use. Furthermore, according to the drip bag 1A, the first center stuck part 13, the second center stuck parts 15, and the reinforcement part 16 extend in the vertical direction of the bag body 2. When the opening 3 is opened, this structure allows the bag body 2 to take an octagonal shape in which the circumferential surface is erected generally vertically from the bottom. Thus, this further facilitates pouring of hot water through the opening 3.

Figure 5:
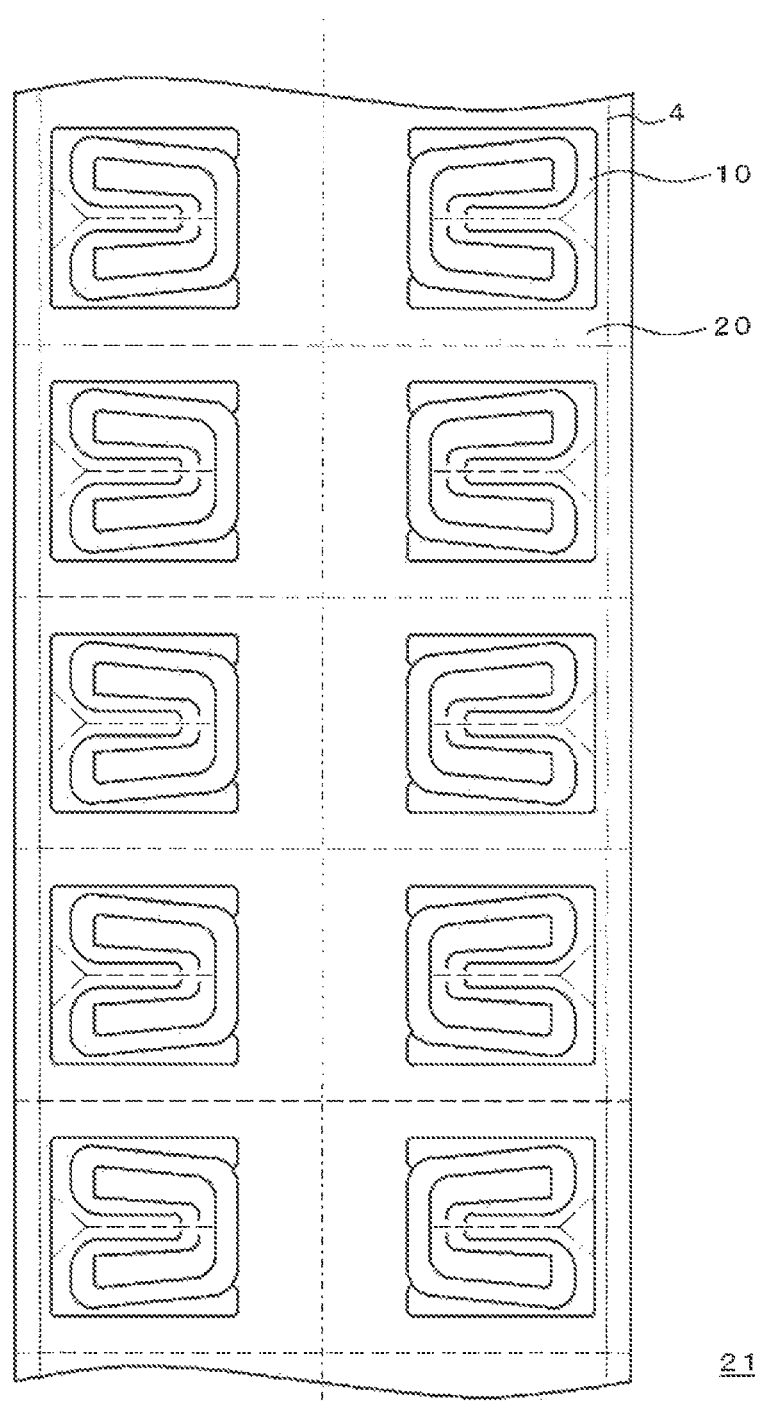
FIG. 5 is a plan view illustrating a drip bag sheet used to manufacture the drip bag of the embodiment.

A method for manufacturing the drip bag of the present invention includes, for example as shown in FIG. 5, preparing a drip bag sheet 21 with elongated water permeable filtering sheets 20 on which a plurality of pairs of hook members 10 are arranged at predetermined intervals so that the bottoms in each pair are spaced apart from and opposed to each other; folding the sheet 21 into two so that the edge sides in the longitudinal direction overlap with each other; and repeatedly welding and cutting the bag body 2 in the transverse direction at intervals of the width thereof while an extraction material such as coffee powder is charged into the bag body one by one. The portions welded and cut as mentioned above are both the sides 2p and 2q of the bag body 2 (FIG. 1A). Furthermore, prior to the welding and cutting in the transverse direction, the water permeable filtering sheet 20 is provided in advance with the opening guide line 4 such as perforations as an opening line for ease of opening. Note that the perforations as the opening guide line 4 may be replaced by a line-shaped fragile portion that is provided, for example, by ultrasound or heat.

Figure 6:
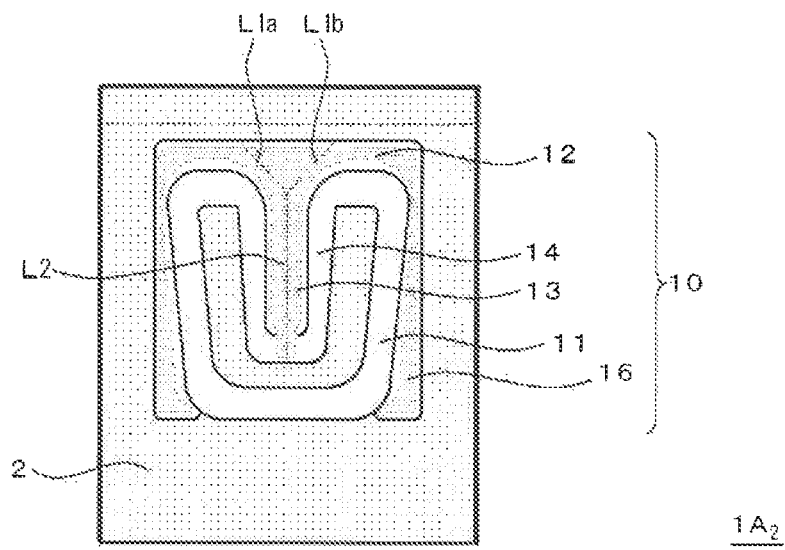
FIG. 6 is a plan view illustrating a drip bag $1A_2$ of an embodiment before being opened.

The drip bag of the present invention can take various forms. For example, like a drip bag $1A_2$ shown in FIG. 6, the second center stuck parts 15 may also be omitted in the drip bag 1A above. Like the aforementioned drip bag 1A, this drip bag $1A_2$ also takes an opening shape that is generally octagonal. Note that since the second center stuck parts 15 are omitted in the drip bag $1A_2$, the shape of the bag body 2 with the opening 3 opened is reduced in diameter toward the bottom when compared with the drip bag 1A mentioned above.

Figure 7:
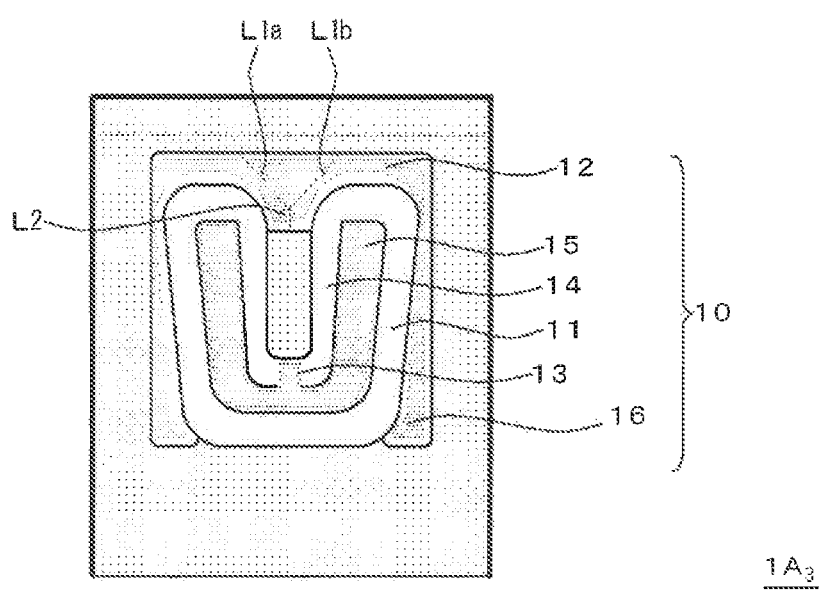
FIG. 7 is a plan view illustrating a drip bag $1A_3$ of an embodiment before being opened.

Furthermore, in the present invention, like a drip bag $1A_3$ shown in FIG. 7, the upper stuck part 12 and the first center stuck part 13 may not have to be continuous to each other in the aforementioned drip bag 1A.

Figure 8:
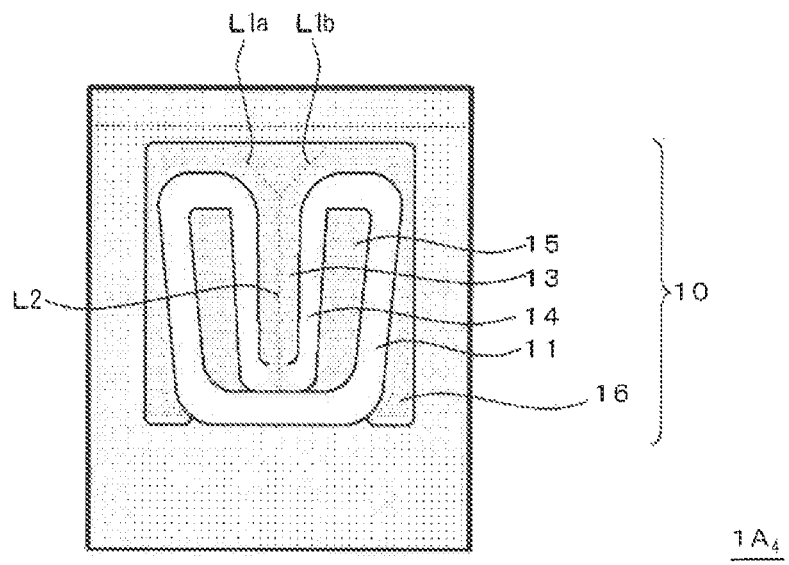
FIG. 8 is a plan view illustrating a drip bag $1A_4$ of an embodiment before being opened.

Like a drip bag $1A_4$ shown in FIG. 8, the lower ends of the arm parts 14 may also be brought into contact with the hook part 11 in the aforementioned drip bag 1A.

Figure 9:
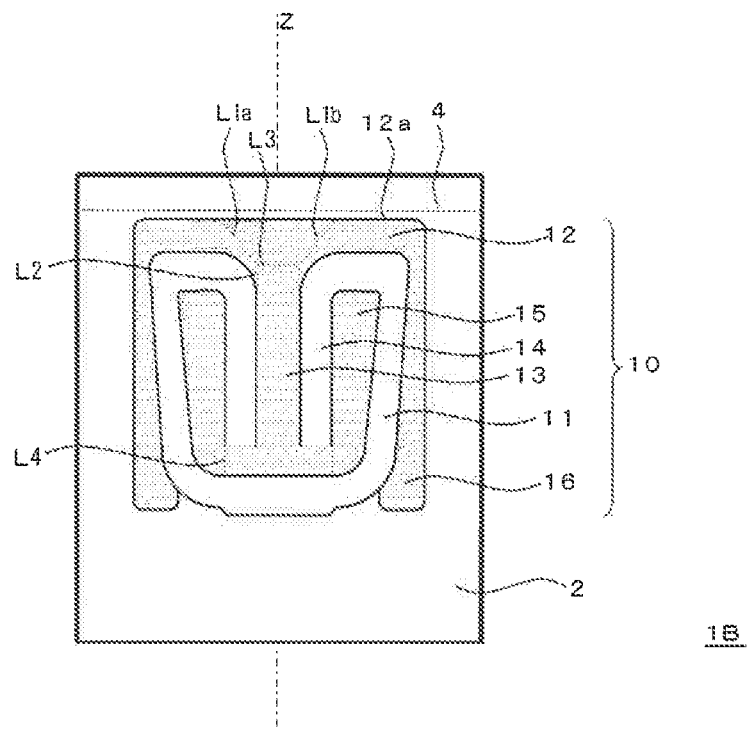
FIG. 9 is a plan view illustrating a drip bag 1B of an embodiment before being opened.

Like a drip bag 1B shown in FIG. 9, the lower ends of the pair of oblique folding lines L1a and Lib may also be spaced apart from each other, and the vertical folding line L2 may extend in a downward direction from the respective lower ends. Even in this case, the oblique folding lines L1a and L1b and the vertical folding lines L2 are formed by perforations, creasing, butting half way through so that the folding lines are readily folded only by pulling the pair of hook parts 11 in the opposite directions.

Figure 10:
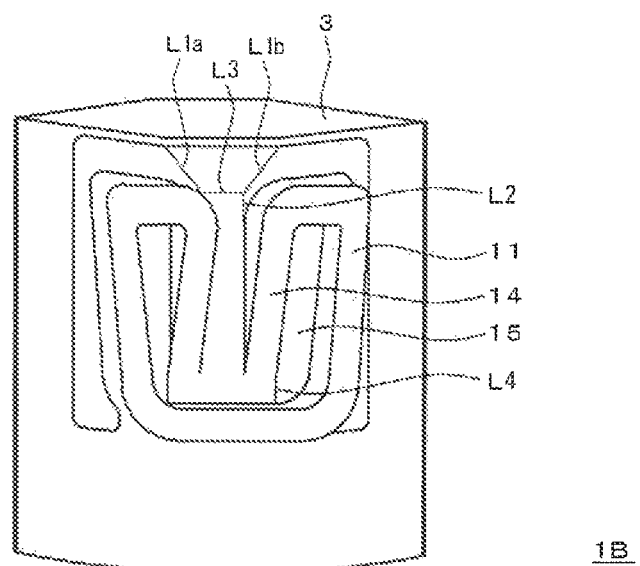
FIG. 10 is a perspective view illustrating the drip bag 1B of the embodiment after being opened.

FIG. 10 is a view illustrating the drip bag 1B which is started to be opened by removing the upper end of the bag body 2 along the opening guide line 4 and then pulling out the hook parts 11 of the pair of hook members 10 in the mutually opposite directions.

As shown in FIG. 9, the drip bag 1B is configured such that the vertical folding lines L2 overlap with the sides of the first center stuck part 13. Thus, pulling the pair of hook parts 11 in the mutually opposite directions causes the first center stuck part 13 to be projected in the direction of the pull with the lower ends of the pair of oblique folding lines L1a and L1b being pulled out in the direction of that pull. This allows the upper end side of the trapezoidal region surrounded by the pair of oblique folding lines L1a and L1b and the upper end side 12a of the upper stuck part 12 to be readily inclined so as to approach the center of the opening 3 of the bag body 2. This in turn preferably makes the upper end side 12a of the upper stuck part 12 to be readily bent into three sides.

In this case, forming a lateral folding line L3 connecting between the lower ends of the pair of oblique folding lines L1a and Lib preferably causes the trapezoid region surrounded by the pair of oblique folding lines L1a and Lib and the upper end side 12a of the upper stuck part 12 to be readily inclined toward the center of the opening 3 of the bag body 2.

Furthermore, lower folding lines L4 are formed so as to extend downwardly from the lower ends of the pair of arm parts 14 that are closer to the sides of the bag body. This arrangement allows the lower portion of the first center stuck part 13 to be folded along the pair of the lower folding lines L4 when the hook parts 11 of the pair of the hook members 10 are pulled in the mutually opposite directions. Thus, when the bag body 2 is opened and the drip bag 1B is hooked on a cup, the bag body 2 is further prone to take an octagonal shape that is vertically erected.

Figure 11:
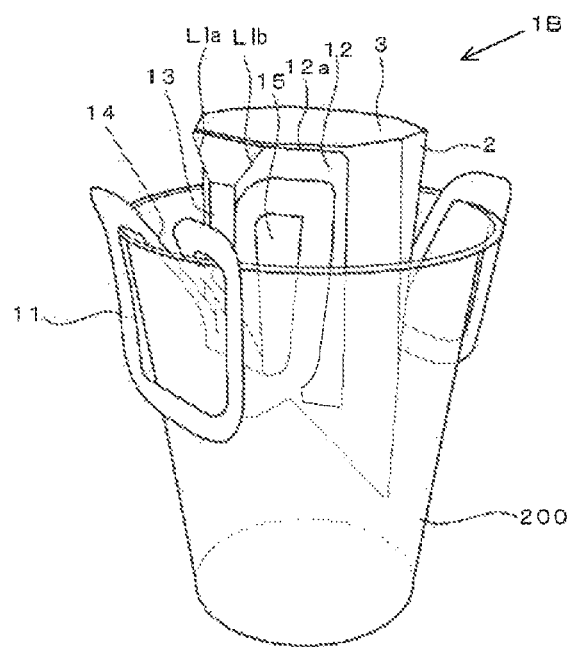
FIG. 11 is a perspective view illustrating the drip bag 1B of the embodiment which is set on a cup.

With this configuration, as shown in FIG. 11, the drip bag 1B can also be configured such that the opening 3 of the bag body 2 can be widely opened in a generally octagonal shape by hooking the hook parts 11 on the cup 200, and the opening shape can be maintained irrespective of the magnitude of the opening diameter of the cup.

Figure 12:
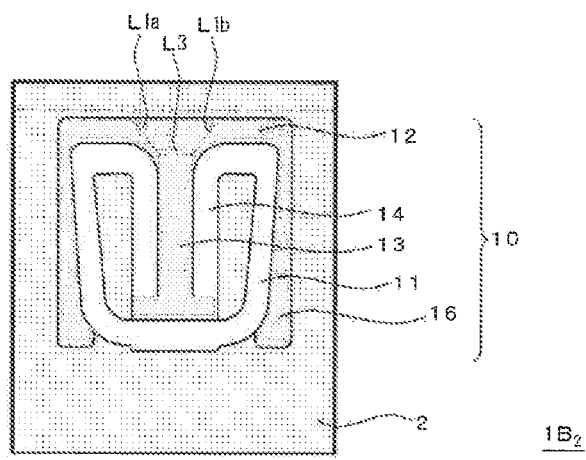
FIG. 12 is a plan view illustrating a drip bag $1B_2$ of an embodiment before being opened.

Thus, even when the vertical folding lines are formed immediately below the respective lower ends of the pair of oblique folding lines L1a and L1b, the second center stuck parts 15 may also be omitted as with a drip bag $1B_2$ shown in FIG. 12.

Figure 13:
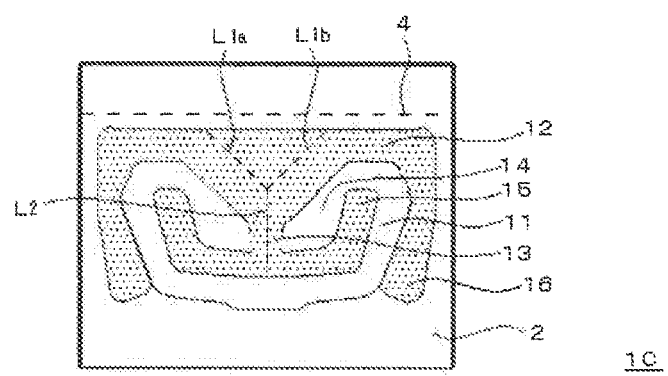
FIG. 13 is a plan view illustrating a drip bag 1C of an embodiment before being opened.

A drip bag 1C of FIG. 13 is derived from the drip bag 1A shown in FIG. 1A and formed by changing the bag body 2 having the vertically elongated flat bag shape in a plan view to a flat bag in a horizontally elongated shape, accordingly with the hook members 10 also formed in a horizontally elongated structure. The first center stuck part 13 is gradually increased in width toward the upper stuck part 12 above the connection between the first center stuck part 13 and the arm parts 14 so as to ensure a V-shaped folding line forming region in which the lower ends of the pair of oblique folding lines L1a and L1b overlap with each other.

Figure 14:
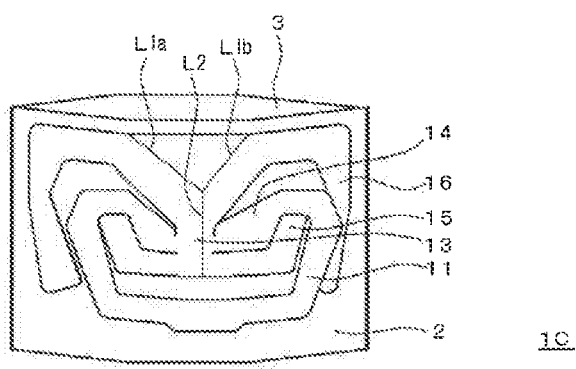
FIG. 14 is a perspective view illustrating the drip bag 1C of the embodiment after being opened.

The drip bag 1C is also configured such that as shown in FIG. 14, the upper stuck part 12 is bent into three sides allowing the opening 3 of the bag body 2 to start to open only by pulling the pair of the hook parts 11 in the opposite directions. Then, when being hooked on a cup, the drip bag 1C can ensure a wide opening area for the opening 3 of the bag body 2.

Figure 15:
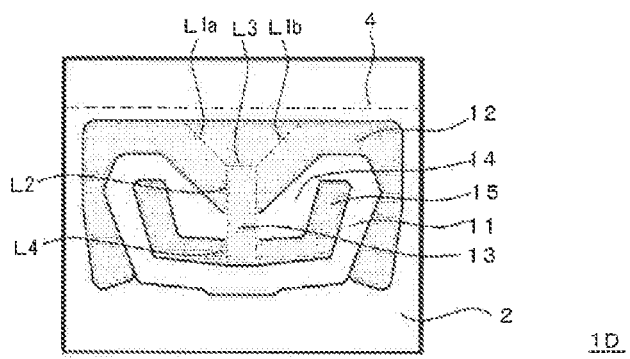
FIG. 15 is a plan view illustrating a drip bag 1D of an embodiment before being opened.

A drip bag 1D of FIG. 15 is derived from the drip bag 1C shown in FIG. 13 and configured such that as with the drip bag 1B shown in FIG. 9, the lower ends of the pair of oblique folding lines L1a and L1b are spaced apart from each other and the vertical folding line L2 extends downwardly from the respective lower ends, and the lateral folding line L3 is formed to connect between the pair of oblique folding lines L1a and L1b. The drip bag 1D is configured such that a pair of lower folding lines L4 extending downwardly from the lower ends of the arm parts 14 are formed on the extended lines of a pair of vertical folding lines L2.

Figure 16:
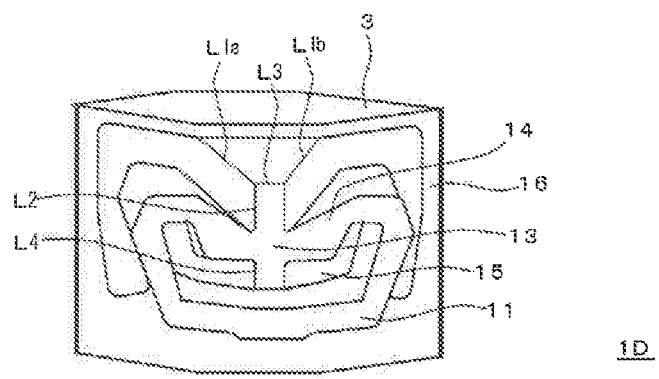
FIG. 16 is a perspective view illustrating the drip bag 1D of the embodiment after being opened.

The drip bag 1D is also configured such that as shown in FIG. 16, the upper stuck part 12 is bent into three sides allowing the opening 3 of the bag body 2 to start to be opened only by pulling the pair of hook parts 11 in the opposite directions. Then, when being hooked on a cup, the drip bag 1D can ensure a wide opening area for the opening 3 of the bag body 2.

Figure 17:
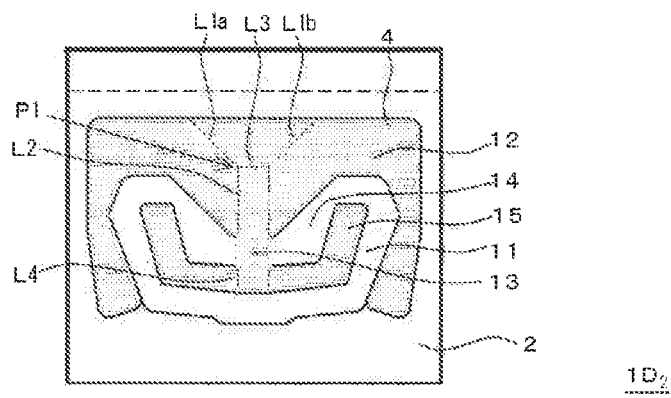
FIG. 17 is a plan view illustrating a drip bag $1D_2$ of an embodiment before being opened.

When the upper stuck part 12 is formed to be increased in width in the aforementioned drip bag, for example, like a drip bag $1D_2$ shown in FIG. 17, the intersection P1 of the pair of oblique folding lines L1a and L1b and the vertical folding line L2 may also be formed within the upper stuck part 12.

Figure 18:
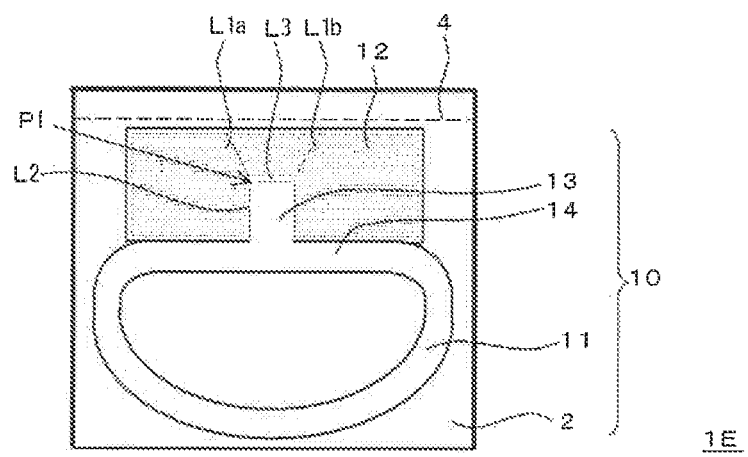
FIG. 18 is a plan view illustrating a drip bag 1E of an embodiment before being opened.

A drip bag 1E of FIG. 18 is configured such that like the drip bag $1D_2$ of FIG. 17, the intersection P1 of the pair of oblique folding lines L1a and L1b and the vertical folding line L2 is formed within the upper stuck part 12.

The drip bag 1E is configured such that part of or the entire elongated region shaded with fine dots along the opening 3 of the bag body 2 is adhered to the outer face of the bag body 2. The upper portion in the elongated region is the upper stuck part 12, and the lower portion of the center part in the width direction of the bag body within the elongated region is the center part 13 that cannot be pulled out and serves as the first center stuck part.

Furthermore, in the drip bag 1E, the reinforcement part 16 is omitted. The arm part 14 extends from the lower ends of the center part 13 horizontally in the right and left directions, and the ends of an arc-shaped hook part 11 are connected to the right and left ends of the arm part 14.

Figure 19:
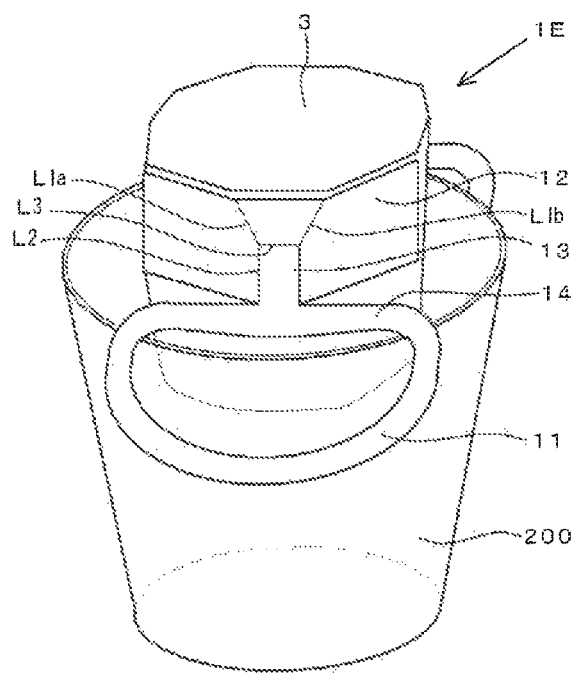
FIG. 19 is a perspective view illustrating the drip bag 1E of the embodiment which is set on a cup.

To hook the drip bag 1E on a cup, the hook parts 11 are pulled out in the mutually opposite directions to raise the arm parts 14, and then the hook parts 11 are engaged with the cup 200 as shown in FIG. 19. At this time, the center parts 13 are pulled out to bend the pair of oblique folding lines L1a and L1b and the vertical folding lines L2 extending downwardly from the lower ends thereof, thereby providing a wide opening 3.

Figure 20:
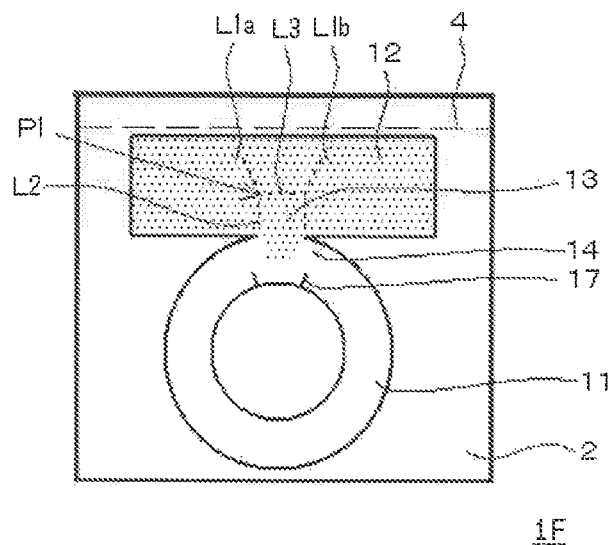
FIG. 20 is a plan view illustrating a drip bag 1F of an embodiment before being opened.
Figure 21:
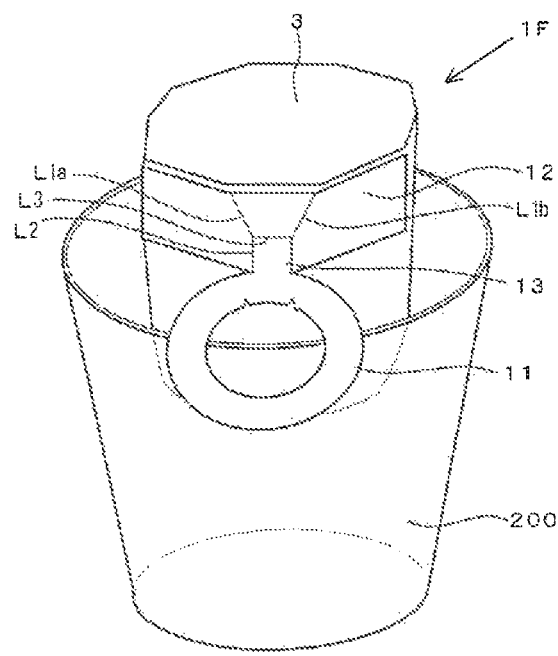
FIG. 21 is a perspective view illustrating the drip bag 1F of the embodiment which is set on a cup.
Figure 22:
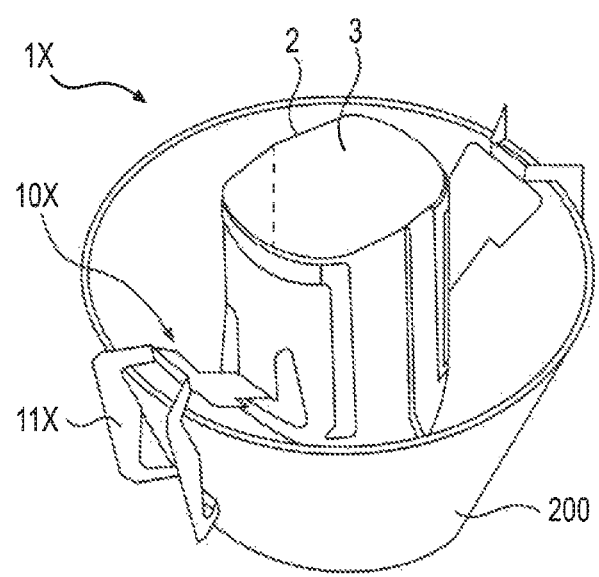
FIG. 22 is a perspective view illustrating a conventional drip bag which is set on a cup.

A drip bag 1F of FIG. 20 is configured such that the arc-shaped hook part 11 of the drip bag 1E of FIG. 18 is replaced by a ring-shaped hook part 11 and the center part 13 is directly adhered to the bag body 2. There are also provided slits 17 in the vicinity of the center part 13 of the ring-shaped hook part 11, so that as shown in FIG. 21, the hook parts 11 can be more easily hooked on the cup 200. Note that even for the drip bag 1F, the center part 13 may not be adhered to the bag body 2, either.

The present invention may also take various forms. For example, for the drip bags described above, the oblique folding lines L1a and L1b are not limited to the straight lines, but may also be slightly curved.

The oblique folding lines and the vertical folding line, which are characteristic to the present invention, produce an effect when being employed in a drip bag in which at least the hook part is continuous to the center part or the first center stuck part via the arm part or directly, and the hook parts are pulled out in the mutually opposite directions and then hooked on a cup, thereby allowing the center part or the first center stuck part to be pulled out.

Note that the modified examples of the drip bags of the aforementioned embodiment can be combined with each other as appropriate.

REFERENCE SIGNS LIST

1A, $1A_2$, $1A_3$, $1A_4$, 1B, $1B_2$, 1C, 1D, $1D_2$, 1E, 1F, 1X drip bag
2 bag body
2p, 2q side
3 opening
4 opening guide line
10, 10X hook member
11, 11X hook part
12 upper stuck part (elongated stuck part)
12a upper end side of upper stuck part (elongated stuck part)
13 center part or first center stuck part
14 arm part
15 second center stuck part
16 reinforcement part 20 water permeable filtering sheet
21 drip bag sheet
200, 200a, 200b cup
201 opening wall of cup
L1a, L1b oblique folding line
L2 vertical folding line
L3 lateral folding line
L4 lower folding line
Z center line

The invention claimed is:

1. A drip bag comprising:
a bag body formed of a water permeable filtering sheet and having an upper end to be opened, the bag body having two opposing surfaces; and
a pair of hook members formed of a plate-shaped material, the pair of hook members being respectively provided on outer faces of the two opposing surfaces of the bag body, each of the pair of hook members including:
an upper stuck part adhered to the bag body along an opening of the bag body;
a center part located below the upper stuck part at a center of the bag body in a width direction of the bag body, the center part being formed so as not to be pulled out from the bag body; and
a hook part not adhered to the bag body, wherein
for each of the pair of hook members, a pair of oblique folding lines are formed to extend downwardly from an upper side of the upper stuck part with a center line disposed there between, the pair of oblique folding lines being more spaced from the center line at an upper portion of the upper stuck part and extending closer to the center line as the pair of oblique folding lines extends from the upper portion of the upper stuck part to a lower portion of the upper stuck part, the center line bisecting a width of the bag body between both vertical side edges of the bag body, and a vertical folding line is formed downwardly from a lower end of each of the oblique folding lines, the lower ends of the oblique folding lines being spaced apart from each other and the two vertical folding lines also being spaced apart from each other, whereby, in use when the pair of hook members are extended away from the bag body, at least the pair of oblique folding lines and the vertical folding lines cause the outer faces of the bag body to protrude outward from a bottom end of the bag body, with the vertical becoming folded to protrude outwardly from the bag body in a respective direction in which the hook part of each of the pair of hook members are pulled.

2. The drip bag according to claim 1, wherein the center part is adhered to the bag body to form a first center stuck part.

3. The drip bag according to claim 2, wherein:
each of the pair of hook members have a pair of arm parts which are formed on both sides of the first center stuck part and which have one end capable of being pulled out; and
the hook part is continuous to the first center stuck part via the arm parts.

4. The drip bag according to claim 3, wherein lower ends of the arm parts are continuous to the first center stuck part, and upper ends of the arm parts are continuous to the hook parts.

5. The drip bag according to claim 2, wherein the first center stuck part is continuous with and extends downwardly from the upper stuck part.

6. The drip bag according to claim 3, wherein each of the pair of hook members has two second center stuck parts adhered to the bag body, the two second center stuck parts being located adjacent to the pair of arm parts and respectively located closer to sides of the bag body than the pair of arm parts.

7. The drip bag according to claim 6, wherein the first center stuck part is continuous to the respective two second center stuck parts of each of the pair of hook members.

8. The drip bag according to claim 2, wherein the vertical folding lines extending downwardly from the respective lower end of each of the pair of oblique folding lines overlap with sides of the first center stuck part.

9. The drip bag according to claim 1, wherein a horizontal folding line is formed to connect between the respective lower end of each of the pair of oblique folding lines.

10. The drip bag according to claim 3, wherein an additional folding line is formed downwardly from a lower end of each arm of the pair of arm parts.

11. The drip bag according to claim 1, wherein an upper end side of the upper stuck part is trisected by the pair of oblique folding lines.

12. The drip bag according to claim 1, wherein an upper end of each of the pair of oblique folding lines is located, on an upper end side of the upper stuck part, at $3/8$ of the width of the bag body from a side toward the center of the bag body, and a distance between the upper stuck part and the side of the bag body is $1/8$ of the width of the bag body.

13. The drip bag according to claim 1, wherein the upper stuck part has an elongated shape.

14. The drip bag according to claim 1, wherein an extraction material is filled in the bag body, and the upper end of the bag body is closed.

15. A drip bag comprising:
a bag body formed of a water permeable filtering sheet and having an upper end to be opened, the bag body having two opposing surfaces; and
a pair of hook members formed of a plate-shaped material, the pair of hook members being respectively provided on outer faces of the two opposing surfaces of the bag body, each of the pair of hook members including:
an upper stuck part adhered to the bag body along an opening of the bag body;
a center part located below the upper stuck part at a center of the bag body in a width direction of the bag body, the center part being formed so as not to be pulled out from the bag body; and
a hook part not adhered to the bag body, wherein
for each of the pair of hook members, a pair of oblique folding lines are formed to extend downwardly from an upper side of the upper stuck part with a center line disposed there between, the pair of oblique folding lines being more spaced from the center line at an upper portion of the upper stuck part and extending closer to the center line as the pair of oblique folding lines extends from the upper portion of the upper stuck part to a lower portion of the upper stuck part, the center line bisecting a width of the bag body between both vertical side edges of the bag body, and a vertical folding line is formed downwardly from a lower end of each of the oblique folding lines, the lower ends of the oblique folding lines being spaced apart from each other and the two vertical folding lines also being spaced apart from each other, whereby, in use when the pair of hook members are extended away from the bag body, at least the pair of oblique folding lines and the vertical folding lines cause the outer faces of the bag body to protrude outward from a bottom end of the bag body, with the vertical folding lines becoming folded to protrude outwardly from the bag body in a respective direction in which the hook part of each of the pair of hook members are pulled and the lower end of each of the pair of oblique folding lines protrude outward farther than an upper end of each of the oblique folding lines.

* * * * *